US012234788B2

(12) United States Patent
Ishizaki et al.

(10) Patent No.: US 12,234,788 B2
(45) Date of Patent: Feb. 25, 2025

(54) MANAGEMENT SYSTEM FOR INTERNAL COMBUSTION ENGINE

(71) Applicant: TOYOTA JIDOSHA KABUSHIKI KAISHA, Toyota (JP)

(72) Inventors: Noriya Ishizaki, Toyota (JP); Haruto Ura, Nagakukte (JP); Takahiro Nakajima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 24 days.

(21) Appl. No.: 18/348,071

(22) Filed: Jul. 6, 2023

(65) Prior Publication Data
US 2024/0011450 A1 Jan. 11, 2024

(30) Foreign Application Priority Data
Jul. 11, 2022 (JP) ................. 2022-111379

(51) Int. Cl.
*F02D 45/00* (2006.01)
*F02B 39/16* (2006.01)
*F02D 41/00* (2006.01)
*F02D 41/22* (2006.01)

(52) U.S. Cl.
CPC ............. *F02D 45/00* (2013.01); *F02B 39/16* (2013.01); *F02D 41/0007* (2013.01); *F02D 41/22* (2013.01); F02D 2200/04 (2013.01); F02D 2200/701 (2013.01); Y02T 10/12 (2013.01)

(58) Field of Classification Search
CPC ...... F02D 45/00; F02D 41/0007; F02D 41/22; F02D 2200/04; F02D 2200/701; F02B 39/16; Y02T 10/12
See application file for complete search history.

(56) References Cited

U.S. PATENT DOCUMENTS

| 9,903,296 B2* | 2/2018 | Matsuo | F02D 41/0007 |
| 2003/0033889 A1* | 2/2003 | Schmid | F02B 39/16 73/862.27 |
| 2010/0089371 A1* | 4/2010 | Shibata | F02D 41/221 123/568.21 |
| 2010/0153067 A1* | 6/2010 | Heinkele | F02D 41/18 702/182 |
| 2014/0326225 A1* | 11/2014 | Shioda | F01M 13/00 123/559.1 |
| 2016/0237936 A1* | 8/2016 | Matsuo | F02D 41/0007 |
| 2016/0312688 A1* | 10/2016 | Matsuo | F02D 41/1446 |

FOREIGN PATENT DOCUMENTS

| JP | 2008-309052 A | 12/2008 |
| JP | 2014-015875 A | 1/2014 |
| JP | 2015-124606 A | 7/2015 |
| WO | WO 2013/080360 A1 | 6/2013 |
| WO | WO 2013/080600 A1 | 6/2013 |

* cited by examiner

*Primary Examiner* — Phutthiwat Wongwian
*Assistant Examiner* — Susan E Scharpf
(74) *Attorney, Agent, or Firm* — Finnegan, Henderson, Farabow, Garrett, and Dunner, LLP

(57) ABSTRACT

Provided is a management system for an internal combustion engine equipped with a turbocharger, the management system including a first acquisition unit configured to acquire an amount of decrease in efficiency of a compressor of the turbocharger, and an information generation unit configured to generate information about maintenance based on the amount of decrease in efficiency.

8 Claims, 15 Drawing Sheets

MANAGEMENT SYSTEM FOR INTERNAL COMBUSTION ENGINE

CROSS-REFERENCE TO RELATED APPLICATION

This application is based upon and claims the benefit of priority of the prior Japanese Patent Application No. 2022-111379, filed on Jul. 11, 2022, the entire contents of which are incorporated herein by reference.

FIELD

The present disclosure relates to a management system for an internal combustion engine.

BACKGROUND

An internal combustion engine provided with a turbocharger is known as disclosed in, for example, International Publication No. 2013/080600 (Patent Document 1).

SUMMARY

When deposits adhere to the compressor of the turbocharger, the efficiency of the turbocharger is reduced. In order to reduce a decrease in efficiency, maintenance such as replacement of components is important. Therefore, an object of the present disclosure is to provide a management system for an internal combustion engine that enables appropriate maintenance.

In one aspect of the present disclosure, there is provide a management system for an internal combustion engine equipped with a turbocharger, the management system including: a first acquisition unit configured to acquire an amount of decrease in efficiency of a compressor of the turbocharger; and an information generation unit configured to generate information about maintenance based on the amount of decrease in efficiency.

The information about maintenance may include at least one of information about replacement of a component of the turbocharger or information about replacement of oil of the internal combustion engine.

The management system may include a first computer and a second computer, the first computer may include the first acquisition unit, the information generation unit, and a first communication unit, the second computer may be mounted on a vehicle on which the internal combustion engine is mounted, and include a second acquisition unit and a second communication unit, the second acquisition unit may acquire information about the vehicle, and the second communication unit may transmit the information about the vehicle to the first communication unit.

The first acquisition unit may acquire a temperature of the compressor and a concentration of insolubles of oil based on the information about the vehicle, and acquire the amount of decrease in efficiency based on the temperature of the compressor and the concentration of insolubles of oil.

The second acquisition unit may acquire the information about the vehicle, and acquire at least one of a temperature of the compressor or a concentration of insolubles of oil based on the information about the vehicle, and the second communication unit may transmit at least one of the temperature of the compressor or the concentration of insolubles of oil to the first communication unit, and the first acquisition unit may acquire the amount of decrease in efficiency based on the temperature of the compressor and the concentration of insolubles of oil.

The second acquisition unit may acquire the amount of decrease in efficiency, the second communication unit may transmit the amount of decrease in efficiency to the first communication unit, and the first acquisition unit may acquire the amount of decrease in efficiency transmitted to the first communication unit.

The first computer may include a third acquisition unit, the third acquisition unit may acquire a usage schedule of a vehicle on which the internal combustion engine is mounted, and the first communication unit may transmit a maintenance notification to the second communication unit based on the usage schedule of the vehicle.

The management system may further include: a fourth acquisition unit; and a route creation unit, the fourth acquisition unit may acquire location information and weather information, and the route creation unit may create a route of a vehicle on which the internal combustion engine is mounted based on the amount of decrease in efficiency, the location information, and the weather information.

The management system may further include a plan creation unit, the first acquisition unit may acquire the amount of decrease in efficiency for each of a plurality of vehicles, and the plan creation unit may create a plan for use of the plurality of vehicles based on the amount of decrease in efficiency of each of the plurality of vehicles.

The management system may include a first computer and a third computer, the first computer may include the first acquisition unit, the information generation unit, and a first communication unit, and the first communication unit may transmit the information about maintenance to the third computer.

DETAILED DESCRIPTION

First Embodiment

Figure 1:
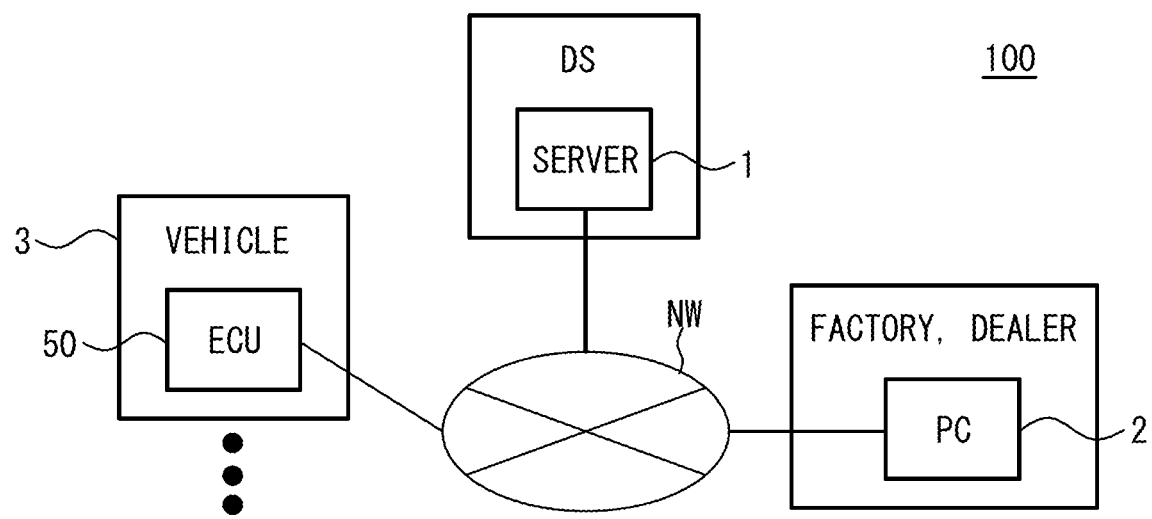
FIG. 1 is a schematic view illustrating a management system for an internal combustion engine.

FIG. 1 is a schematic view illustrating a management system 100 for an internal combustion engine in accordance with a first embodiment. The management system 100 includes a server 1 (a first computer), an electronic control unit (ECU) 50 (a second computer), and a personal computer (PC) 2 (a third computer), and manages a vehicle 3. The server 1 is installed in a data center DS or the like, for example. The server 1 is provided as a cloud service and is used by, for example, automobile manufacturers.

The ECU 50 is mounted on the vehicle 3. The PC 2 is installed in, for example, a factory or a dealer. The server 1, the ECU 50, and the PC 2 are connected to a communication network NW. The ECUs 50 of a plurality of vehicles 3 are connected to the server 1 via the communication network NW. The communication network NW is, for example, the Internet.

Figure 2:
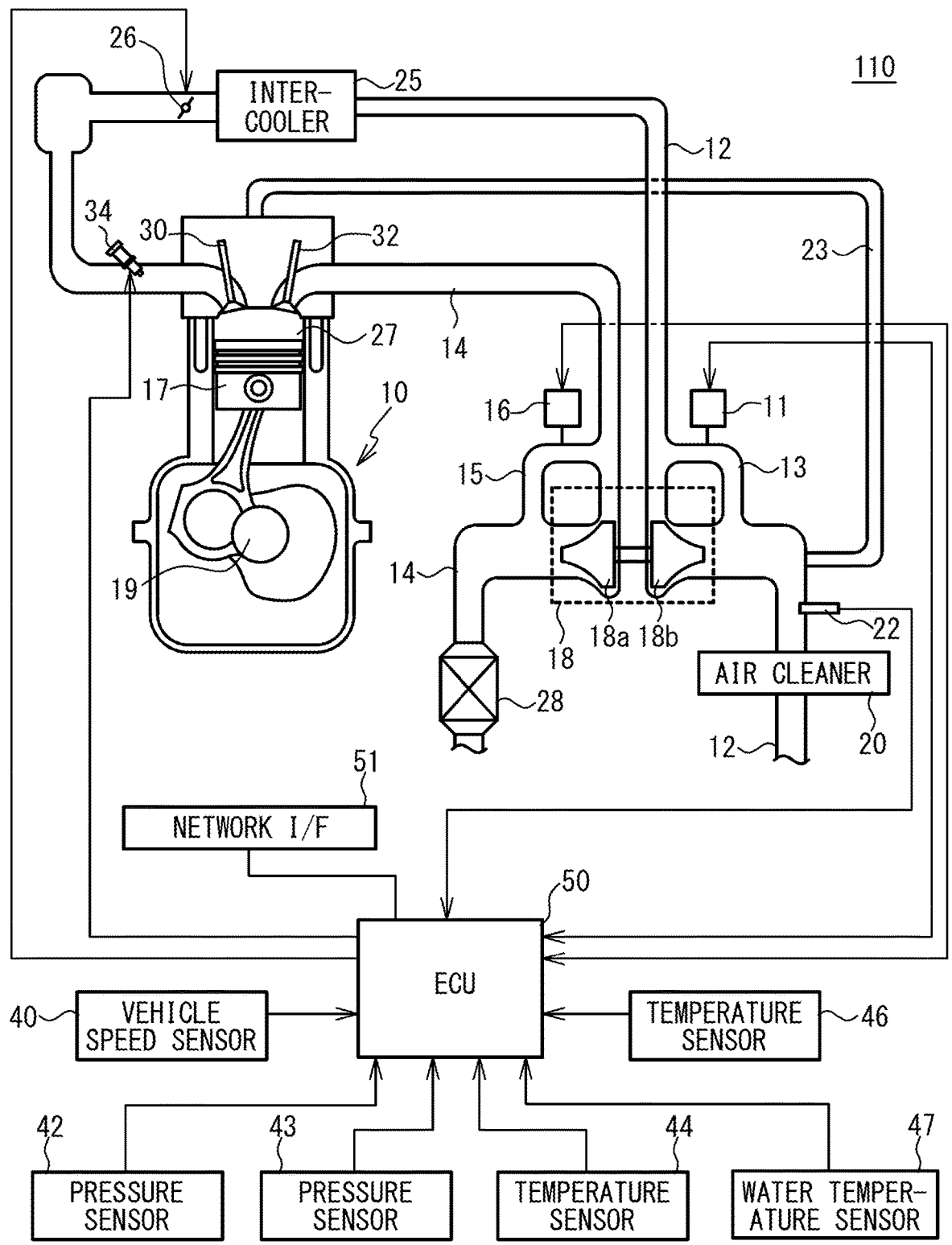
FIG. 2 is a schematic view illustrating an engine system.

FIG. 2 is a schematic diagram illustrating an engine system 110. The engine system 110 is mounted on the vehicle 3, and includes an internal combustion engine 10, a turbocharger 18, and the electronic control unit (ECU) 50.

The internal combustion engine 10 is, for example, a gasoline engine or a diesel engine, and includes a piston 17, an intake valve 30, an exhaust valve 32, and a fuel injection valve 34. A combustion chamber 27 is formed in a bore of the internal combustion engine 10. The fuel injection valve 34 is provided in an intake passage 12, but may be provided in the combustion chamber 27. The piston 17 is disposed inside the combustion chamber 27 and connected to a crankshaft 19.

The intake passage 12 and an exhaust passage 14 are connected to the internal combustion engine 10. The intake passage 12 is provided with an air cleaner 20, an air flow meter 22, an intercooler 25, a throttle valve 26, and the fuel injection valve 34 in this order from the upstream side. A catalyst 28 is provided in the exhaust passage 14.

The turbocharger 18 includes a turbine 18a and a compressor 18b. The turbine 18a and the compressor 18b are connected to each other. The turbine 18a is located upstream of the catalyst 28 in the exhaust passage 14. The compressor 18b is located downstream of the air flow meter 22 and upstream of the intercooler 25 in the intake passage 12. The turbine 18a and the compressor 18b are housed inside a housing (not illustrated).

A bypass passage 13 bypassing the compressor 18b is connected to the intake passage 12, and a valve 11 is provided in the bypass passage 13. When the accelerator is turned off, air is bypassed from the downstream side to the upstream side of the compressor 18b through the bypass passage 13. A bypass passage 15 bypassing the turbine 18a is connected to the exhaust passage 14, and a valve 16 is provided in the bypass passage 15.

A positive crankcase ventilation (PCV) passage 23 is connected to the internal combustion engine 10 and to a position in the intake passage 12 upstream of the compressor 18b of the turbocharger 18. The blow-by gas is returned to the intake passage 12 through the PCV passage 23, and flows through the intake passage 12 together with air. Oil (engine oil) is mixed into the blow-by gas. Deposits are generated from insolubles contained in the oil and adhere to the compressor 18b. The adhesion of the deposits decreases the efficiency of the turbocharger 18.

Intake air passes through the intake passage 12, is purified by the air cleaner 20, and is cooled by the intercooler 25. When the intake valve 30 is opened, intake air is introduced into the combustion chamber 27 of the internal combustion engine 10. The fuel injection valve 34 injects fuel into the combustion chamber 27. When a spark plug (not illustrated) ignites, an air-fuel mixture of intake air and fuel burns in the combustion chamber 27. The piston 17 reciprocates up and down in the combustion chamber 27, the driving force is transmitted to the crankshaft 19, and the vehicle 3 travels.

When the exhaust valve 32 is opened, exhaust gas generated by combustion is discharged to the exhaust passage 14. The exhaust gas is purified by the catalyst 28 in the exhaust passage 14 and is discharged. The catalyst 28 is, for example, a three-way catalyst, and purifies carbon monoxide (CO), hydrocarbon (HC), nitrogen oxide (NOx), and the like in the exhaust gas.

When the exhaust gas is introduced into the turbine 18a of the turbocharger 18, the turbine 18a rotates, and the compressor 18b coupled to the turbine 18a also rotates. The intake air is supercharged by the rotation of the compressor 18b, and the intake air having a higher pressure than the intake air at the upstream side of the compressor 18b is fed into the combustion chamber 27 of the internal combustion engine 10.

The accumulation of deposits on the compressor 18b of the turbocharger 18 reduces the efficiency of the compressor 18b. Deposits are generated by insolubles of the oil of the internal combustion engine 10. When the temperature of the compressor 18b rises, the oil tends to evaporate. When the oil evaporates, insolubles contained in the oil are concentrated and hardened, and adhere to the compressor 18b as deposits. In order to inhibit a decrease in efficiency of the compressor 18b, for example, maintenance such as replacement of components of the turbocharger 18 or replacement of oil is performed.

The engine system 110 includes the air flow meter 22, a vehicle speed sensor 40, pressure sensors 42 and 43, temperature sensors 44 and 46, and a water temperature sensor 47. The air flow meter 22 detects the flow rate of intake air. The vehicle speed sensor 40 detects a speed (vehicle speed) of the vehicle 3 on which the engine system 110 is mounted. The pressure sensor 42 detects the atmospheric pressure. The pressure sensor 43 detects a pressure (supercharging pressure) of the air supercharged by the turbocharger 18. The temperature sensor 44 detects the temperature of the outside air. The temperature sensor 46 detects the temperature of the air in the intake passage 12. The water temperature sensor 47 detects the temperature of cooling water of the internal combustion engine 10.

The ECU 50 includes an arithmetic device such as a central processing unit (CPU) and a storage device such as a random access memory (RAM) and a read only memory (ROM). The ECU 50 performs various controls by executing a program stored in the ROM or the storage device.

The ECU 50 controls the opening degree of the throttle valve 26 and the opening degrees of the valves 11 and 16. The valve 11 is an air bypass valve (ABV), and can release supercharged air by opening the valve when the accelerator is OFF. The ECU 50 switches on and off of fuel injection from the fuel injection valve 34 to control the injection amount of fuel.

The ECU 50 functions as a second acquisition unit. The ECU 50 acquires the flow rate of intake air from the air flow meter 22, acquires the vehicle speed from the vehicle speed sensor 40, and acquires the fuel injection amount. The ECU 50 acquires the atmospheric pressure from the pressure sensor 42, and acquires the pressure of the air introduced into the compressor 18*b* based on the atmospheric pressure. The ECU 50 acquires the supercharging pressure from the pressure sensor 43. The ECU 50 acquires the temperature of the outside air from the temperature sensor 44, the temperature of the air in the intake passage 12 from the temperature sensor 46, and the water temperature from the water temperature sensor 47. The ECU 50 may calculate at least one of the temperature of the member (the member temperature) of the compressor 18*b* or the concentration of insolubles in the oil. The ECU 50 may calculate an amount of decrease in efficiency of the compressor 18*b*.

The engine system 110 includes a network interface (UF) 51 (a second communication unit). The network OF 51 performs communication between the vehicle 3 and the server 1. The network OF 51 transmits the date acquired by the ECU 50 to the sever 1.

Figure 3A:
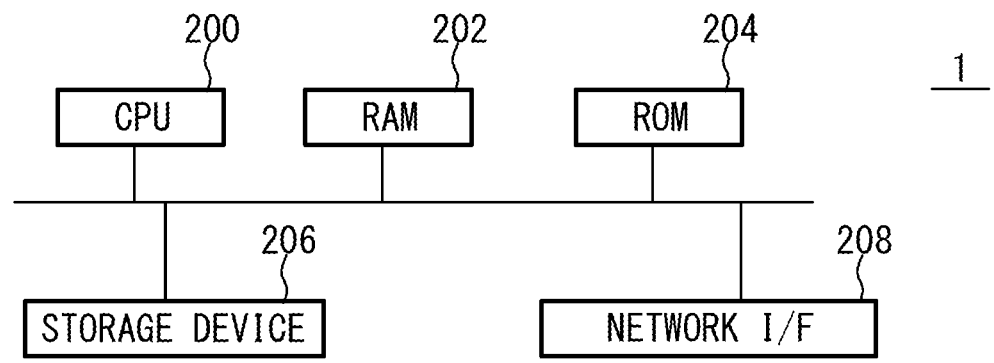
FIG. 3A is a schematic diagram illustrating a hardware configuration of a server.

FIG. 3A is a schematic diagram illustrating a hardware configuration of the server 1. The sever 1 includes a CPU 200, a RAM 202, a ROM 204, a storage device 206, and a network interface (UF) 208. The CPU 200, the RAM 202, the ROM 204, the storage device 206, and the network OF 208 are connected to each other by a bus.

The storage device 206 is a non-volatile storage medium such as a hard disk drive (HDD) and a flash memory. The network OF 208 is connected to the communication network NW of FIG. 1.

Programs stored in the ROM 204 or the storage device 206 are temporarily stored in the RAM 202. When the CPU 200 executes a program stored in the RAM 202, the CPU 200 implements various functions described later and executes various processes described later. The program corresponds to the flowchart described later. The PC 2 illustrated in FIG. 1 also has a hardware configuration similar to that of FIG. 3A.

Figure 3B:
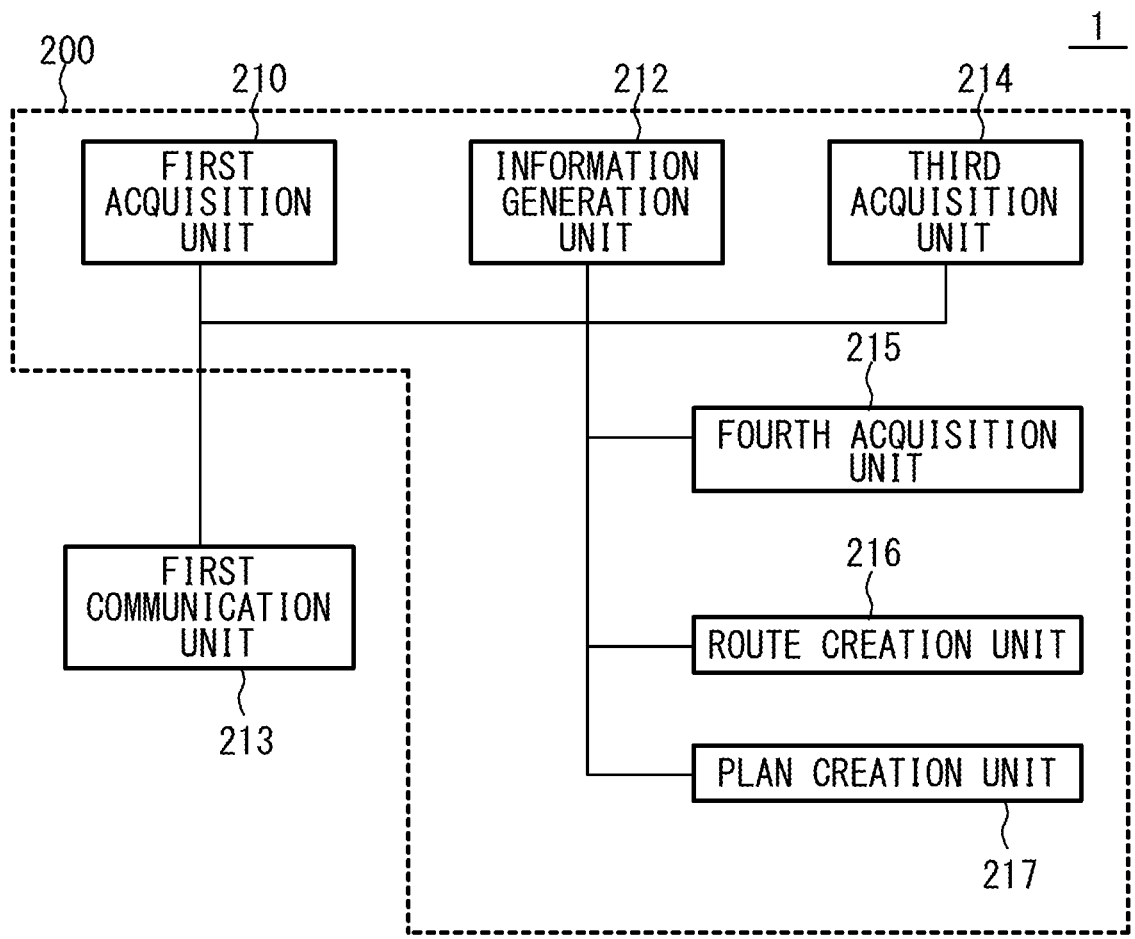
FIG. 3B is a block diagram illustrating functions of the server.

FIG. 3B is a block diagram illustrating functions of the server 1. The server 1 includes a first acquisition unit 210, an information generation unit 212, a first communication unit 213, a third acquisition unit 214, a fourth acquisition unit 215, a route creation unit 216, and a plan creation unit 217.

The first acquisition unit 210, the information generation unit 212, the third acquisition unit 214, the fourth acquisition unit 215, the route creation unit 216, and the plan creation unit 217 are implemented by the CPU 200. The first communication unit 213 is implemented by the network OF 208, and communicates with the ECU 50 and the PC 2 via the communication network NW.

The first acquisition unit 210 acquires the amount of decrease in efficiency of the compressor 18*b*. The third acquisition unit 214 acquires the schedule of the user to acquire the usage schedule of the vehicle 3. The fourth acquisition unit 215 acquires location information regarding the destination of the vehicle 3 and weather information. The route creation unit 216 creates a route to the destination of the vehicle 3. The plan creation unit 217 creates a usage plan for a plurality of the vehicles 3. The plan is, for example, a usage plan of company vehicles in a company having a plurality of company vehicles.

The information generation unit 212 generates information about maintenance. The information about maintenance is, for example, information about replacement of components of the turbocharger 18 and replacement of oil. The information about replacement of components includes the type and number of components to be replaced, the time of replacement, and the like. The information about the replacement of oil includes the type of oil, the time of replacement, and the like.

Figure 4:
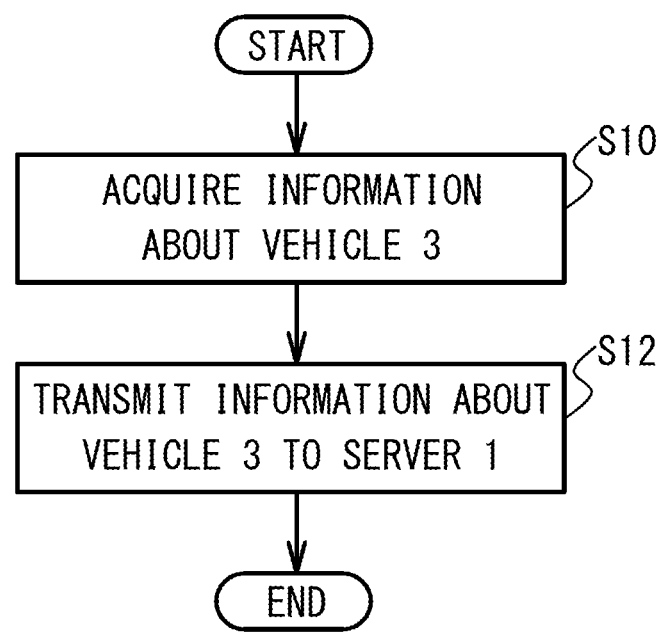
FIG. 4 is a flowchart illustrating the operation of the management system.
Figure 5:
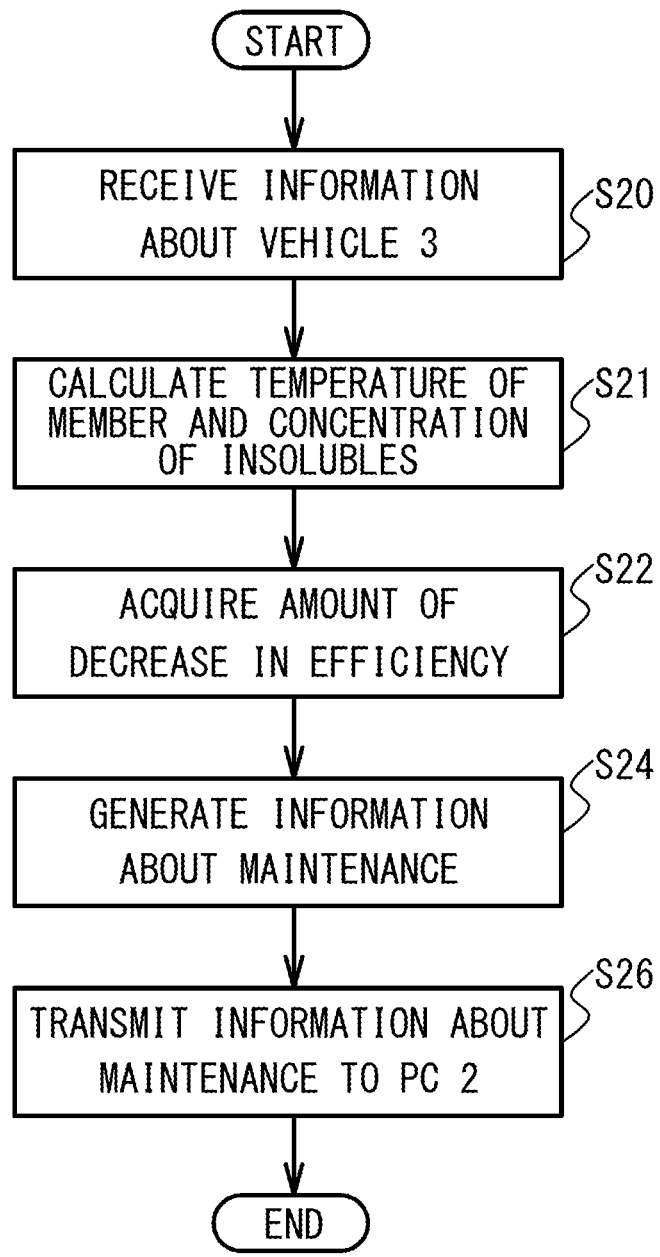
FIG. 5 is a flowchart illustrating the operation of the management system.

FIG. 4 and FIG. 5 are flowcharts illustrating the operation of the management system 100. FIG. 4 is a flowchart illustrating a process performed by the ECU 50. As illustrated in FIG. 4, the ECU 50 acquires information about the vehicle 3 (step S10). The information about the vehicle 3 includes supercharging pressure, the pressure of the air introduced into the compressor 18*b*, the temperature of the outside air, the temperature of the air in the intake passage 12, the flow rate of the air in the intake passage 12, the vehicle speed, the fuel injection amount, and the water temperature. The ECU 50 transmits information about the vehicle 3 to the sever 1 (step S12). Then, the process ends.

FIG. 5 is a flowchart illustrating a process executed by the server 1. The first communication unit 213 receives the information about the vehicle 3 transmitted by the ECU 50 (step S20). The first acquisition unit 210 calculates the temperature of the member (housing) of the compressor 18*b* and the concentration of insolubles in the oil based on the information about the vehicle 3 (step S21). Specifically, the first acquisition unit 210 calculates the temperature of the member of the compressor 18*b* based on the supercharging pressure, the pressure of the air introduced into the compressor 18*b*, the temperature of the outside air, the temperature of the air, the flow rate of the air, and the vehicle speed. The first acquisition unit 210 calculates the concentration of insolubles in the oil based on the fuel injection amount and the water temperature.

The first acquisition unit 210 estimates the generation amount of deposits based on the temperature of the member of the compressor 18*b* and the concentration of insolubles in the oil, and acquires the amount of decrease in efficiency of the compressor 18*b* from the amount of deposits (step S22). The information generation unit 212 generates information about maintenance based on the amount of decrease in efficiency (step S24). The first communication unit 213 transmits information about maintenance to the PC 2 (step S26). The PC 2 receives the information about maintenance from the sever 1. Then, the process of FIG. 5 ends.

In the first embodiment, the first acquisition unit 210 acquires the amount of decrease in efficiency of the compressor 18*b*. The information generation unit 212 generates information about maintenance of the turbocharger 18. Therefore, appropriate maintenance is possible.

The information about maintenance includes information about replacement of components of the turbocharger 18 and information about replacement of oil. Since the preparation for the maintenance is performed based on the information about maintenance, it is possible to shorten the waiting time of the user and perform quick maintenance. The information about maintenance may be at least one of information about replacement of components or information about replacement of oil.

The sever 1 transmits the information about maintenance to the PC 2. The PC 2 is installed in, for example, a factory or a dealer. The worker in the factory or the like reflects the information about maintenance transmitted to the PC 2 in the production plan of the components of the turbocharger 18, manufactures components for replacement, and ships the components. The worker of the dealer refers to the information about maintenance transmitted to the PC 2, checks the inventory of the components of the turbocharger 18 and oil, and orders the components and the oil. Therefore, quick maintenance is possible. It is possible to predict man-hours for maintenance and a space for storing components and oil.

The server 1 may be installed in a datacenter or the like, and the PC 2 may be installed in a place (a factory, a dealer, or the like) different from the server 1. As described above, the information about maintenance is transmitted from the sever 1 to the PC 2. For example, the server 1 may be installed in a factory or a dealer. The information about maintenance generated by the server 1 can be checked by workers in the factory to prepare for maintenance.

The server 1 communicates with the ECU 50 mounted in the vehicle 3. The ECU 50 transmits information about the vehicle 3 in real time. The server 1 sequentially acquires the information about the vehicle 3 and generates the information about maintenance. Therefore, appropriate maintenance is possible.

The CPU 200 calculates the temperature of the member of the compressor 18b based on the supercharging pressure, the pressure of the air introduced into the compressor 18b, the temperature of the outside air, the temperature of the air, the flow rate of the air, the vehicle speed, and the like. The CPU 200 calculates the concentration of insolubles in the oil based on the fuel injection amount and the water temperature. The CPU 200 acquires the amount of decrease in efficiency of the compressor 18b based on the temperature of the member and the concentration of insolubles. As the temperature of the member is higher and the concentration of insolubles is higher, deposits are more likely to be generated, and the amount of decrease in efficiency becomes larger. The server 1 receives the information about the vehicle 3 in real time, and calculates the amount of decrease in efficiency based on the information. The sever 1 transmits the information about maintenance to the PC 2. A dealer or the like can prepare for maintenance in advance. Therefore, it is possible to shorten the waiting time of a user and to perform proper maintenance.

Next, variations will be described. Description of the same configuration as in the first embodiment will be omitted. The following processes of FIG. 6A, FIG. 6B, and FIG. 7 may be executed in parallel to the processes of FIG. 4 and FIG. 5. Here, it is assumed that the amount of decrease in efficiency has been obtained.

First Variation

Figure 6A:
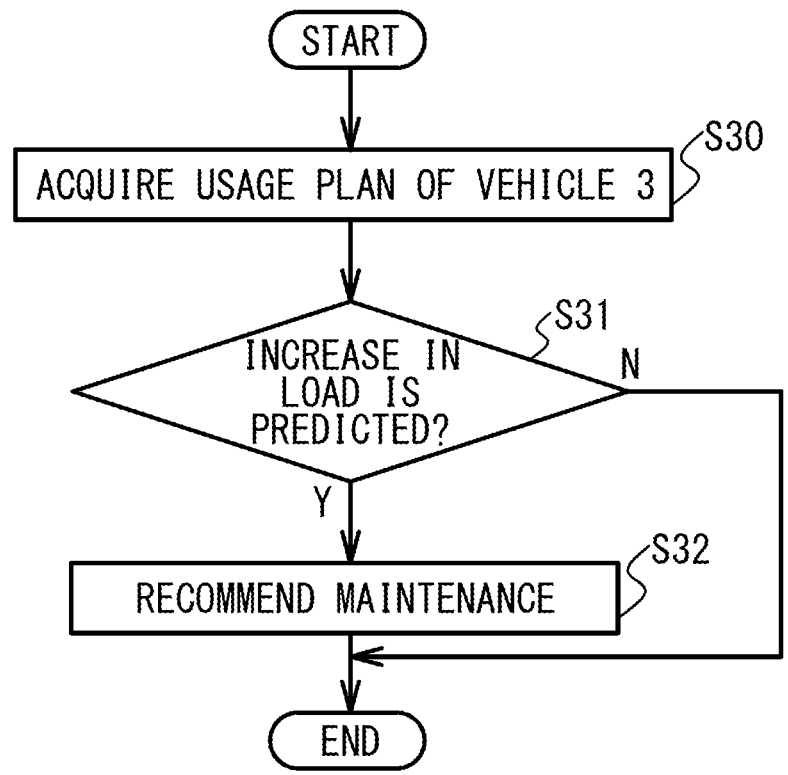
FIG. 6A is a flowchart illustrating the operation of a management system in accordance with a first variation.

FIG. 6 a is a flowchart illustrating the operation of a management system in accordance with a first variation. The user of the vehicle 3 records the schedule in the server 1. As illustrated in FIG. 6A, the third acquisition unit 214 acquires the schedule to acquire the usage schedule of the vehicle 3 (step S30). The third acquisition unit 214 determines whether an increase in the load on the turbocharger 18 is predicted from the usage schedule (step S31). The increase in the load means an increase in the load on the turbocharger 18 due to, for example, circuit running and towing (pulling).

In the case of a negative determination (No) in step S31, the process ends. In the case of an affirmative determination (Yes), the sever 1 recommends maintenance to the vehicle 3 (step S32). When the notification of the maintenance recommendation is transmitted from the first communication unit 213 to the vehicle 3, the ECU 50 recommends the maintenance to the user by sound or screen display, for example. Then, the process of FIG. 6A ends. The user can perform maintenance before using the vehicle 3.

Second Variation

Figure 6B:
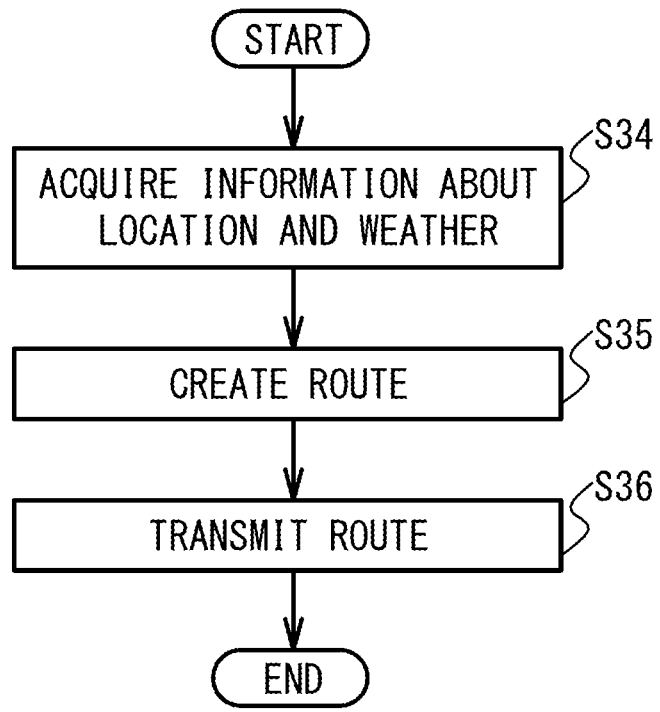
FIG. 6B is a flowchart illustrating the operation of a management system in accordance with a second variation.

FIG. 6B is a flowchart illustrating the operation of a management system in accordance with a second variation. As illustrated in FIG. 6B, the fourth acquisition unit 215 acquires, for example, the information about the location of the destination of the vehicle 3 and weather information (step S34). The route creation unit 216 creates a route (step S35). When the temperature is high, deposits are more likely generated. When the atmospheric pressure is low, the load on the turbocharger 18 increases. The load on the turbocharger 18 increases on an uphill. For example, the route creation unit 216 may create a route with a large amount of decrease in efficiency, a route with a small amount of decrease in efficiency, or the like. The first communication unit 213 transmits the created route to the vehicle 3 (step S36). The user of the vehicle 3 can drive the vehicle 3 with reference to the received route. Then, the process of FIG. 6B ends.

The user can inhibit a decrease in efficiency of the turbocharger 18 by avoiding a route with a high load. This inhibits a decrease in the value of the vehicle 3, which is advantageous for resale, for example.

Third Variation

Figure 7:
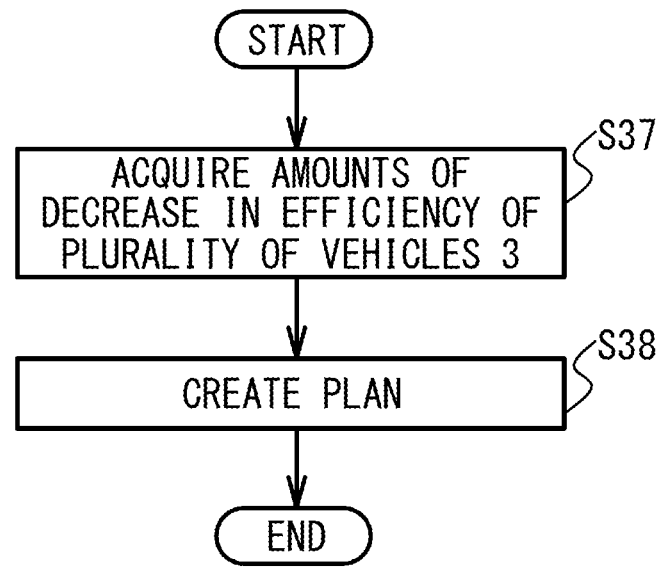
FIG. 7 is a flowchart illustrating the operation of a management system in accordance with a third variation.

FIG. 7 is a flowchart illustrating the operation of a management system in accordance with a third variation. The first acquisition unit 210 acquires the amount of decrease in efficiency of the vehicle 3 (step S37). The plan creation unit 217 creates a plan for usage of a plurality of the vehicles 3 on the basis of the amount of decrease in efficiency of each of the plurality of the vehicles 3 (step S38). Then, the process of FIG. 7 ends. The usage plan includes the frequency of use, the order of use, and the like for each vehicle.

An organization such as a company or an individual may own a plurality of the vehicles 3. When only one of the vehicles 3 is continuously used, a large amount of deposits is accumulated in the turbocharger 18 of the vehicle 3, and the efficiency is also significantly reduced. The repair cost of the vehicle 3 is increased. When a plurality of the vehicles 3 are used at substantially the same frequency, the amount of decrease in efficiency is also substantially the same. Therefore, repair costs can be reduced. Additionally, it is possible to increase a price of the vehicle when the vehicle is sold.

Second Embodiment

Figure 8:
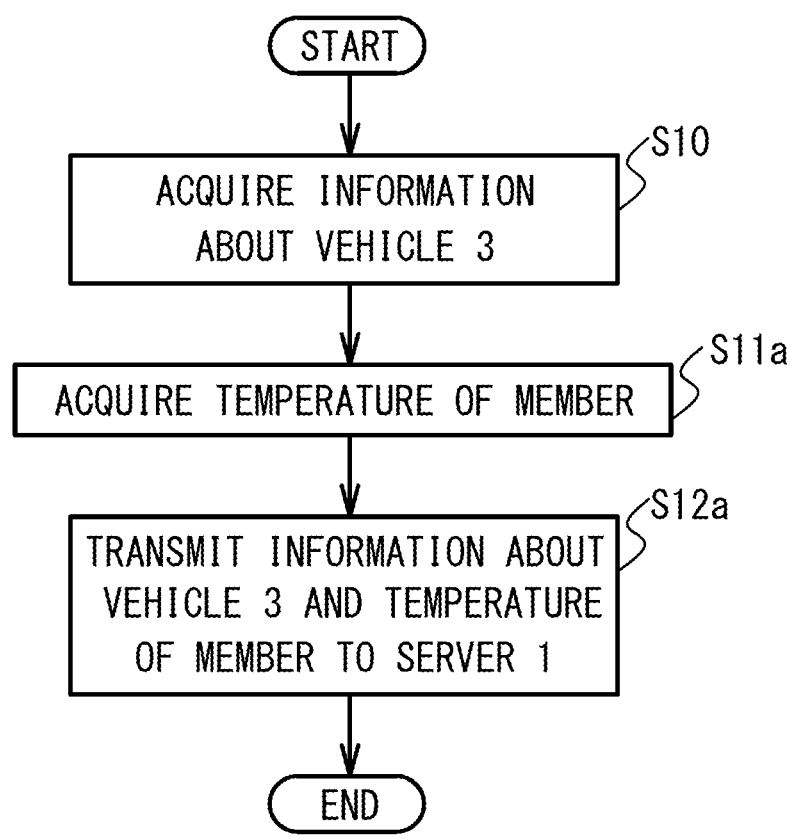
FIG. 8 is a flowchart illustrating the operation of a management system in accordance with a second embodiment.
Figure 9:
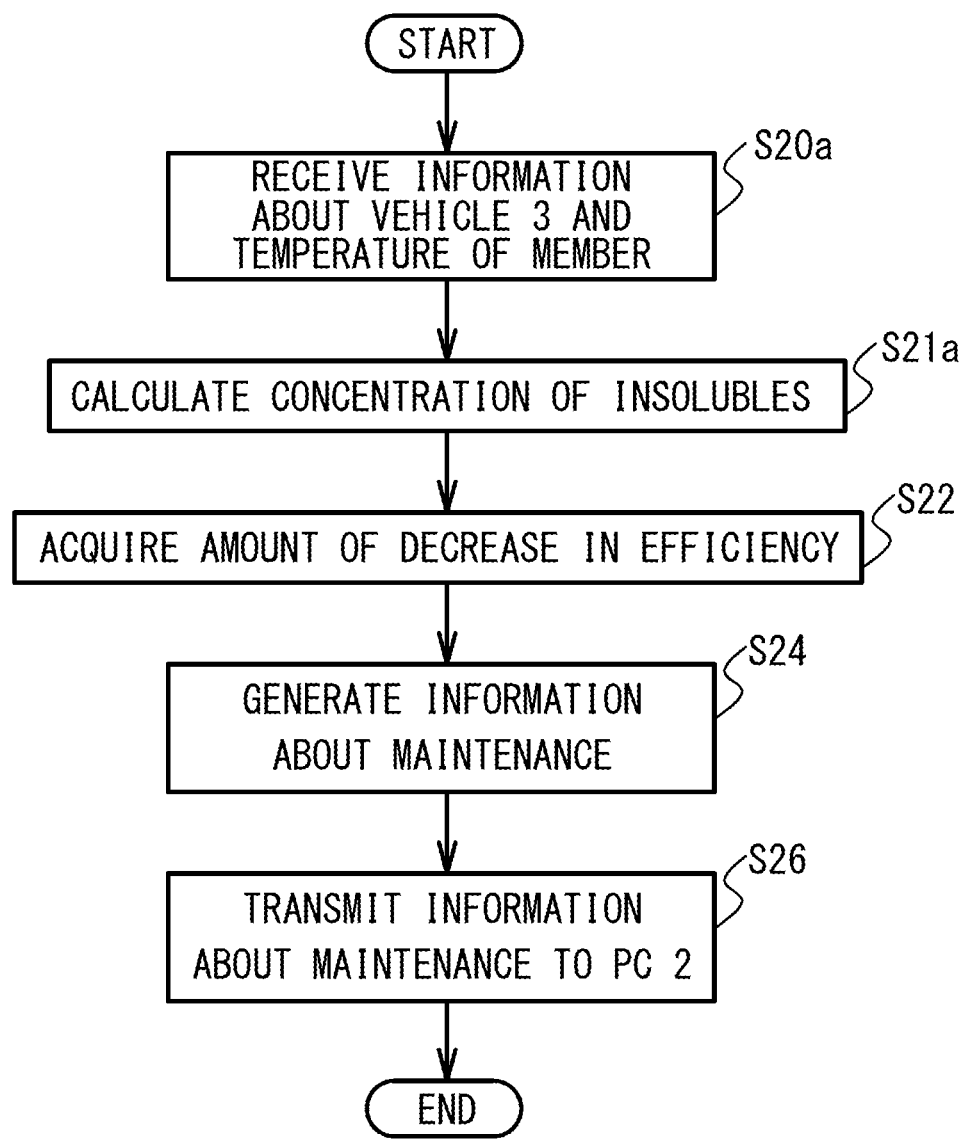
FIG. 9 is a flowchart illustrating the operation of the management system in accordance with the second embodiment.

FIG. 8 and FIG. 9 are flowcharts illustrating the operation of a management system in accordance with a second embodiment. Description of the same configuration as in the first embodiment will be omitted. The configurations illustrated in FIG. 1 to FIG. 3B are common to the second embodiment. In the second embodiment, the processes illustrated in FIG. 8 and FIG. 9 are performed instead of those illustrated in FIG. 4 and FIG. 5.

FIG. 8 is a flowchart illustrating a process performed by the ECU 50. As illustrated in FIG. 8, the ECU 50 acquires information about the vehicle 3 (step S10). The ECU 50 acquires the temperature of the member of the compressor 18b (step S11a). The ECU 50 transmits the information about the vehicle 3 and the temperature of the member to the sever 1 (step S12a). Then, the process of FIG. 8 ends.

FIG. 9 is a flowchart illustrating a process executed by the server 1. The first communication unit 213 of the server 1 receives the information about the vehicle 3 and the temperature of the member transmitted by the ECU 50 (step S20a). The first acquisition unit 210 calculates the concentration of insolubles in the oil based on the information about the vehicle 3 (step S21a).

The first acquisition unit 210 acquires the amount of decrease in efficiency of the compressor 18b (step S22). The information generation unit 212 generates information about maintenance (step S24), and the first communication unit 213 transmits the information about maintenance to the PC 2 (step S26). The PC 2 receives the information about maintenance from the sever 1. Then, the process of FIG. 9 ends.

In the second embodiment, the ECU 50 of the vehicle 3 transmits the temperature of the member together with the information about the vehicle 3. The server 1 acquires the concentration of insolubles based on the information about the vehicle 3. The server 1 acquires the amount of decrease in efficiency from the temperature of the member and the concentration of insolubles of the oil. The server 1 generates the information about maintenance based on the amount of decrease in efficiency. Therefore, appropriate maintenance can be performed. The information about maintenance may be transmitted to the PC 2, and a dealer or the like may prepare for maintenance. This shortens the waiting time of a user and enables quick maintenance.

Third Embodiment

Figure 10:
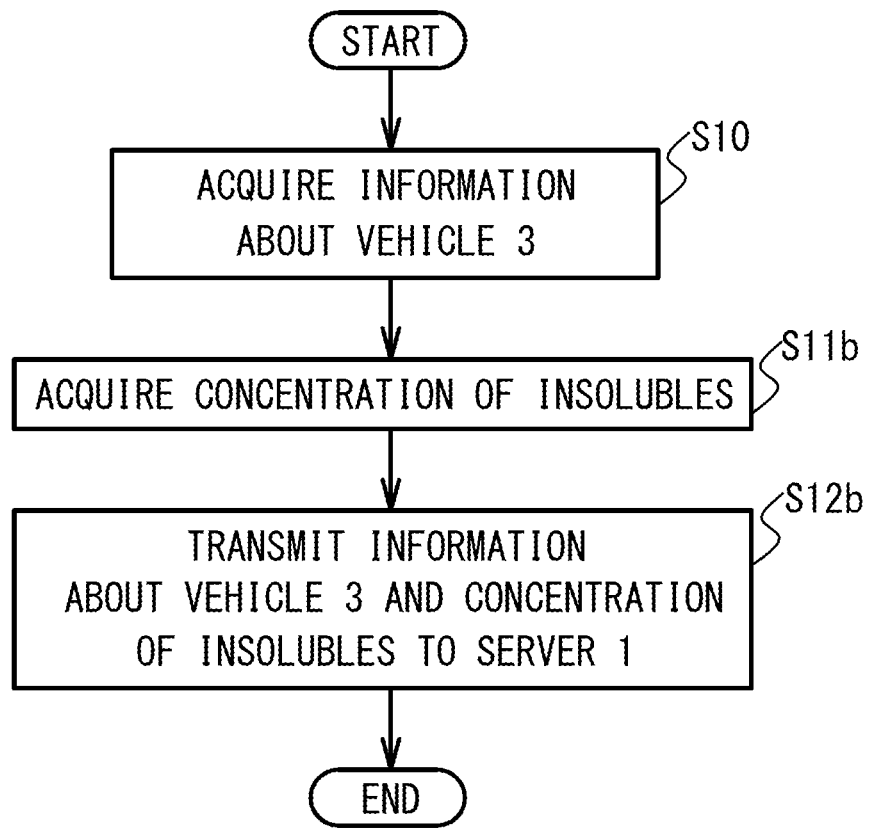
FIG. 10 is a flowchart illustrating the operation of a management system in accordance with a third embodiment.
Figure 11:
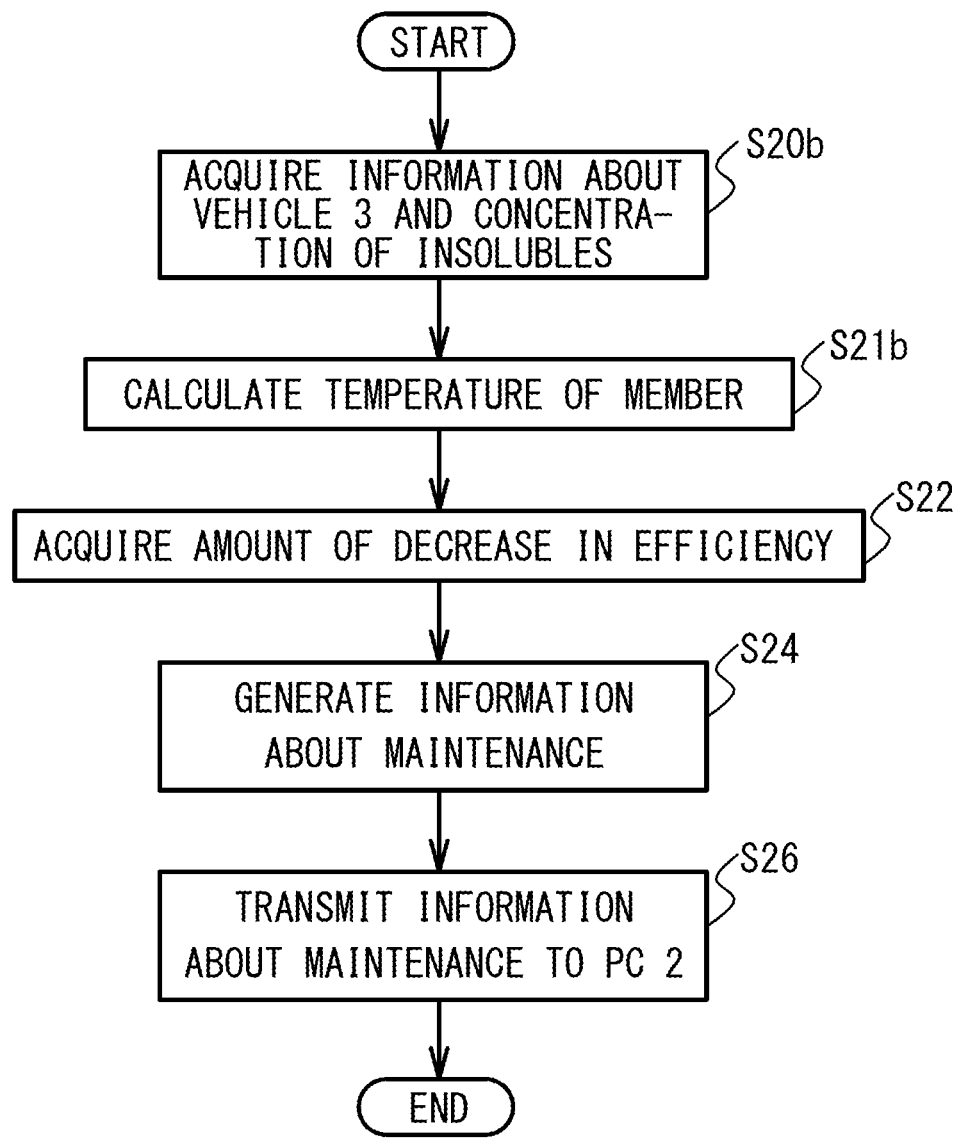
FIG. 11 is a flowchart illustrating the operation of the management system in accordance with the third embodiment.

FIG. 10 and FIG. 11 are flowcharts illustrating the operation of a management system in accordance with a third embodiment. Description of the same configurations as those of the first embodiment and the second embodiment will be omitted. The configurations illustrated in FIG. 1 to FIG. 3B are common to the third embodiment. In the third embodiment, the processes illustrated in FIG. 10 and FIG. 11 are performed instead of those illustrated FIG. 4 and FIG. 5.

FIG. 10 is a flowchart illustrating a process performed by the ECU 50. As illustrated in FIG. 10, the ECU 50 acquires information about the vehicle 3 (step S10). The ECU 50 acquires the concentration of insolubles in the oil (step S11b). The ECU 50 transmits the information about the vehicle 3 and the concentration of insolubles to the sever 1 (step S12b). Then, the process of FIG. 10 ends.

FIG. 11 is a flowchart illustrating a process executed by the server 1. The first communication unit 213 receives the information about the vehicle 3 and the concentration of insolubles transmitted by the ECU 50 (step S20b). The first acquisition unit 210 calculates the temperature of the member of the compressor 18b based on the information about the vehicle 3 (step S21b).

The first acquisition unit 210 acquires the amount of decrease in efficiency of the compressor 18b (step S22). The information generation unit 212 generates information about maintenance (step S24), and the first communication unit 213 transmits the information about maintenance to the PC 2 (step S26). The PC 2 receives the information about maintenance from the sever 1. Then, the process of FIG. 11 ends.

In the third embodiment, the ECU 50 of the vehicle 3 transmits the concentration of insolubles together with the information about the vehicle 3. The server 1 acquires the temperature of the member based on the information about the vehicle 3. The server 1 acquires the amount of decrease in efficiency from the temperature of the member and the concentration of insolubles in the oil. The server 1 generates information about maintenance based on the amount of decrease in efficiency. Therefore, proper maintenance is possible.

Fourth Embodiment

Figure 12:
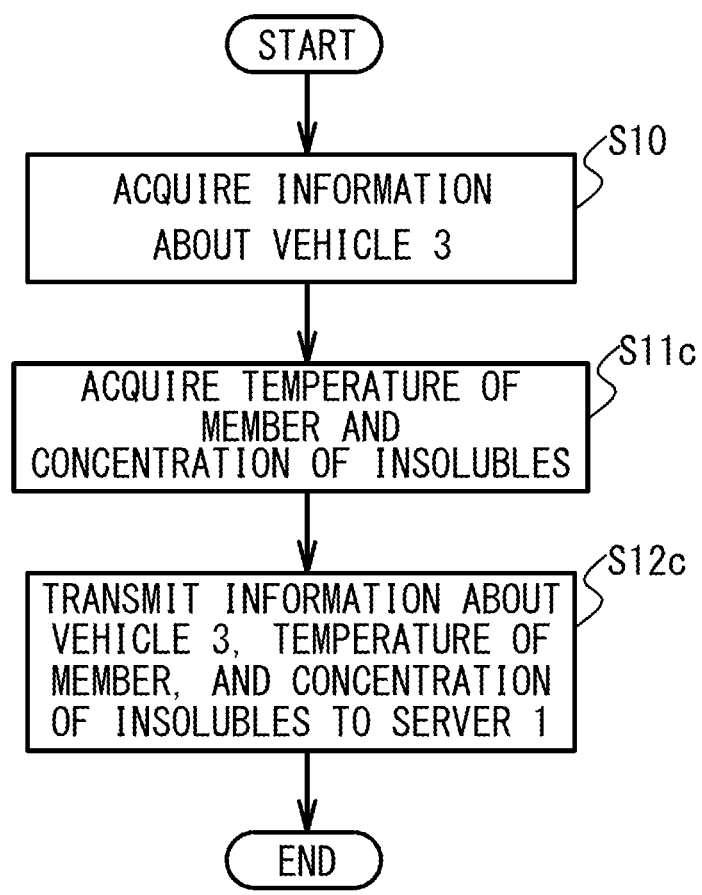
FIG. 12 is a flowchart illustrating the operation of a management system in accordance with a fourth embodiment.
Figure 13:
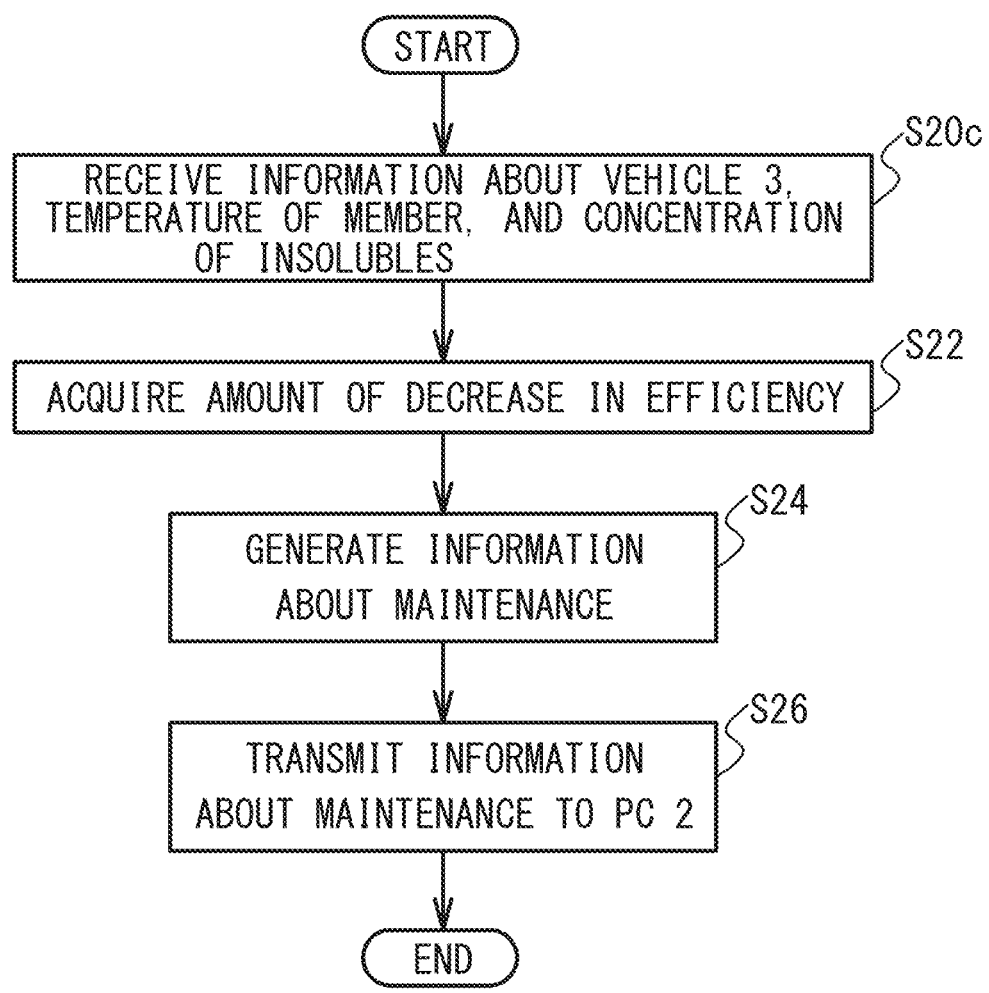
FIG. 13 is a flowchart illustrating the operation of the management system in accordance with the fourth embodiment.

FIG. 12 and FIG. 13 are flowcharts illustrating the operation of a management system in accordance with a fourth embodiment. Description of the same configurations as those in the first to third embodiments will be omitted. The configurations illustrated in FIG. 1 to FIG. 3B are common to the fourth embodiment. In the fourth embodiment, the processes illustrated n in FIG. 12 and FIG. 13 are performed instead of those illustrated in FIG. 4 and FIG. 5.

FIG. 12 is a flowchart illustrating a process performed by the ECU 50. As illustrated in FIG. 12, the ECU 50 acquires information about the vehicle 3 (step S10). Based on the information about the vehicle 3, the ECU 50 acquires the temperature of the member of the compressor 18b and the concentration of insolubles in the oil (step S11c). The ECU 50 transmits the information about the vehicle 3, the temperature of the member, and the concentration of insolubles to the sever 1 (step S12c). Then, the process of FIG. 12 ends.

FIG. 13 is a flowchart illustrating a process executed by the server 1. The first communication unit 213 receives the information about the vehicle 3, the temperature of the member, and the concentration of insolubles transmitted by the ECU 50 (step S20c). The first acquisition unit 210 acquires the amount of decrease in efficiency of the compressor 18b (step S22). The information generation unit 212 generates information about maintenance (step S24), and the first communication unit 213 transmits the information about maintenance to the PC 2 (step S26). The PC 2 receives the information about maintenance from the sever 1. Then, the process of FIG. 13 ends.

In the fourth embodiment, the ECU 50 of the vehicle 3 transmits the temperature of the member and the concentration of insolubles together with the information about the vehicle 3. The server 1 acquires the amount of decrease in efficiency from the temperature of the member and the concentration of insolubles in the oil. The server 1 generates information about maintenance based on the amount of decrease in efficiency. Therefore, proper maintenance is possible.

Fifth Embodiment

Figure 14:
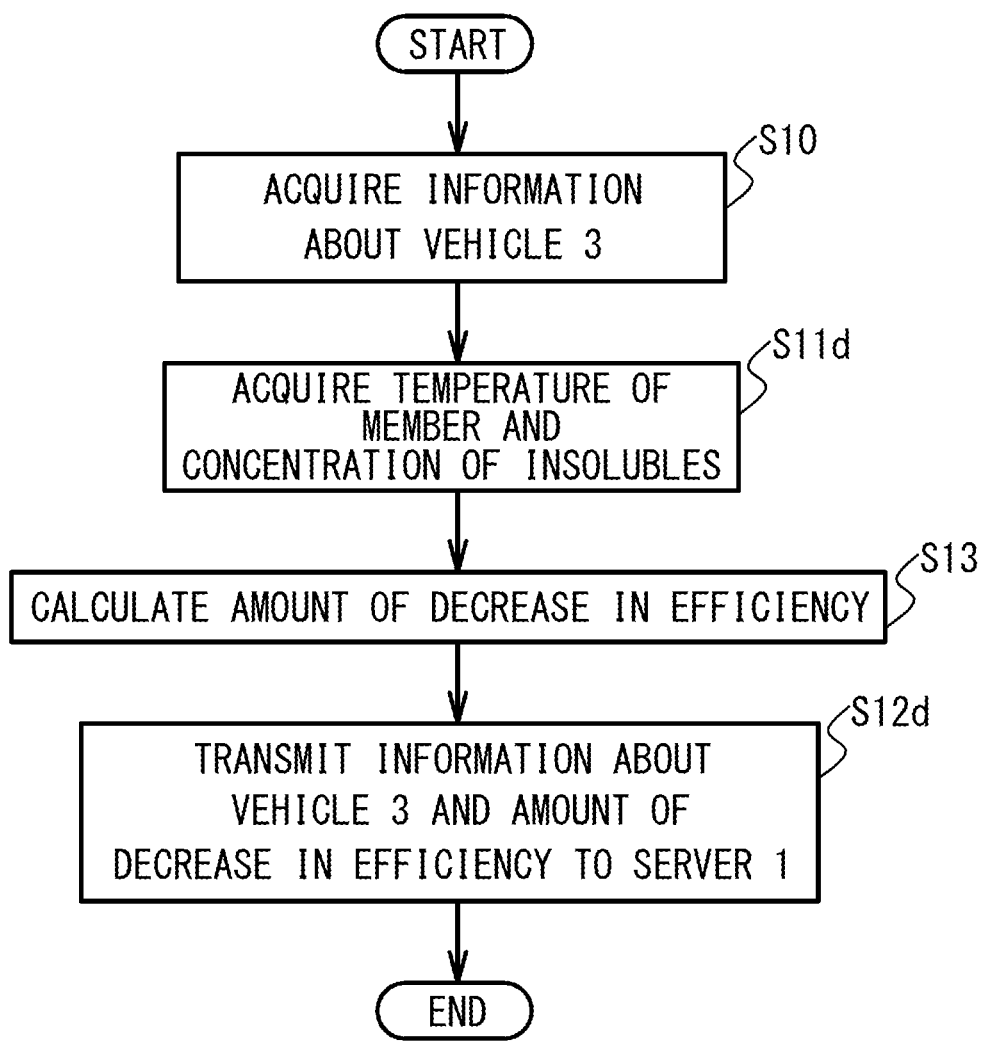
FIG. 14 is a flowchart illustrating the operation of a management system in accordance with a fifth embodiment.
Figure 15:
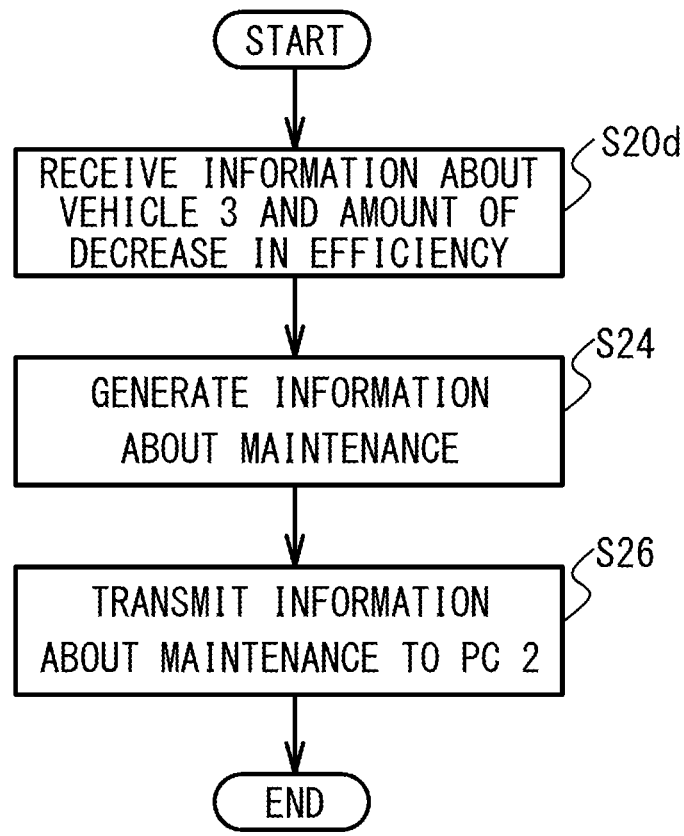
FIG. 15 is a flowchart illustrating the operation of the management system in accordance with the fifth embodiment.

FIG. 14 and FIG. 15 are flowcharts illustrating the operation of a management system in accordance with a fifth embodiment. Description of the same configurations as those in the first to fourth embodiments will be omitted. The configurations illustrated in FIG. 1 to FIG. 3B are common to the fifth embodiment. In the fifth embodiment, the processes illustrated in FIG. 14 and FIG. 15 are performed instead of those illustrated in FIG. 4 and FIG. 5.

FIG. 14 is a flowchart illustrating a process performed by the ECU 50. As illustrated in FIG. 14, the ECU 50 acquires information about the vehicle 3 (step S10). Based on the information about the vehicle 3, the ECU 50 acquires the temperature of the member of the compressor 18b and the concentration of insolubles in the oil (step S11d). The ECU 50 calculates the amount of decrease in efficiency of the compressor 18b based on the temperature of the member and the concentration of insolubles (step S13). The ECU 50 transmits the information about the vehicle 3 and the amount of decrease in efficiency to the sever 1 (step S12d). Then, the process of FIG. 14 ends.

FIG. 15 is a flowchart illustrating a process executed by the server 1. The first communication unit 213 of the server 1 receives the information about the vehicle 3 and the amount of decrease in efficiency transmitted by the ECU 50 (step S20d). The information generation unit 212 generates information about maintenance (step S24), and the first communication unit 213 transmits the information about maintenance to the PC 2 (step S26). The PC 2 receives the information about maintenance from the sever 1. Then, the process of FIG. 15 ends.

In the fifth embodiment, the ECU 50 of the vehicle 3 transmits the amount of decrease in efficiency together with the information about the vehicle 3. The server 1 generates the information about maintenance based on the amount of decrease in efficiency. Therefore, proper maintenance is possible.

As described in the second to fourth embodiments, the ECU 50 of the vehicle 3 may acquire at least one of the temperature of the member or the concentration of insolubles and transmit the acquired information to the sever 1. As in the fifth embodiment, the ECU 50 may acquire the amount of decrease in efficiency and transmit it to the sever 1. Information about the vehicle 3 (supercharging pressure, pressure of air introduced into the compressor 18b, temperature of outside air, temperature of air, flow rate of air, vehicle speed, fuel injection amount, and water temperature) is transmitted from the ECU 50 to the server 1 also for purposes other than managing the efficiency of the compressor 18b. Therefore, as illustrated in FIG. 4, the ECU 50 may transmit the information to the sever 1 without calculating the temperature of the member, the concentration of insolubles, and the amount of decrease in efficiency (step S12). The load on the ECU 50 can be reduced and the amount of data transmission can be reduced. Based on the information received from the ECU 50, the sever 1 may calculate the temperature of the member, the concentration of insolubles, and the amount of decrease in efficiency (steps S21 and S22 in FIG. 5).

Although some embodiments of the present invention have been described in detail, the present invention is not limited to the specific embodiments but may be varied or changed within the scope of the present invention as claimed.

What is claimed is:

1. A management system for an internal combustion engine equipped with a turbocharger, the management system comprising:
a first computer; and
a second computer,
wherein the first computer is configured to acquire an amount of decrease in efficiency of a compressor of the turbocharger,
wherein the first computer is configured to generate information about maintenance based on the amount of decrease in efficiency,
wherein the first computer includes a first communication interface,
wherein the second computer is mounted on a vehicle on which the internal combustion engine is mounted, and includes a second communication interface,
wherein the second computer acquires information about the vehicle,
wherein the second communication interface transmits the information about the vehicle to the first communication interface, and
wherein the first computer acquires a temperature of the compressor and a concentration of insolubles of oil based on the information about the vehicle, and acquires the amount of decrease in efficiency based on the temperature of the compressor and the concentration of insolubles of oil.

2. The management system according to claim 1, wherein the information about maintenance includes at least one of information about replacement of a component of the turbocharger or information about replacement of oil of the internal combustion engine.

3. The management system according to claim 1,
wherein the second computer acquires the information about the vehicle, and acquires at least one of a temperature of the compressor or a concentration of insolubles of oil based on the information about the vehicle, and
wherein the second communication interface transmits at least one of the temperature of the compressor or the concentration of insolubles of oil to the first communication interface, and
wherein the first computer acquires the amount of decrease in efficiency based on the temperature of the compressor and the concentration of insolubles of oil.

4. The management system according to claim 1,
wherein the second computer acquires the amount of decrease in efficiency,
wherein the second communication interface transmits the amount of decrease in efficiency to the first communication interface, and
wherein the first computer acquires the amount of decrease in efficiency transmitted to the first communication interface.

5. The management system according to claim 1,
wherein the first computer acquires a usage schedule of a vehicle on which the internal combustion engine is mounted, and
wherein the first communication interface transmits a maintenance notification to the second communication interface based on the usage schedule of the vehicle.

6. The management system according to claim 1,
wherein the first computer acquires location information and weather information, and
wherein the first computer creates a route of the vehicle on which the internal combustion engine is mounted based on the amount of decrease in efficiency, the location information, and the weather information.

7. The management system according to claim 1,
wherein the first computer acquires the amount of decrease in efficiency for each of a plurality of vehicles, and
wherein the first computer creates a plan for use of the plurality of vehicles based on the amount of decrease in efficiency of each of the plurality of vehicles.

8. The management system according to claim 1,
wherein the management system includes a first computer and a third computer, and
wherein the first communication interface transmits the information about maintenance to the third computer.

* * * * *